United States Patent
Shao et al.

(10) Patent No.: US 11,782,090 B2
(45) Date of Patent: Oct. 10, 2023

(54) BUILT-IN SELF-TEST CIRCUIT AND BUILT-IN SELF-TEST METHOD FOR PHYSICAL UNCLONABLE FUNCTION QUALITY CHECK

(71) Applicant: PUFsecurity Corporation, Hsinchu County (TW)

(72) Inventors: Chi-Yi Shao, Hsinchu County (TW); Kai-Hsin Chuang, Hsinchu County (TW); Jun-Heng You, Hsinchu County (TW); Meng-Yi Wu, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 89 days.

(21) Appl. No.: 17/412,281

(22) Filed: Aug. 26, 2021

(65) Prior Publication Data
US 2022/0187364 A1 Jun. 16, 2022

Related U.S. Application Data

(60) Provisional application No. 63/124,085, filed on Dec. 11, 2020.

(51) Int. Cl.
*G01R 31/28* (2006.01)
*G01R 31/3177* (2006.01)
(Continued)

(52) U.S. Cl.
CPC ...... *G01R 31/3177* (2013.01); *G06F 11/1004* (2013.01); *G11C 7/067* (2013.01); *H04L 9/3278* (2013.01)

(58) Field of Classification Search
CPC . G01R 31/3177; G06F 11/1004; G11C 7/067; G11C 29/021; G11C 29/028;
(Continued)

(56) References Cited

U.S. PATENT DOCUMENTS 9,432,298 B1 * 8/2016 Smith ................. H04L 49/9057
2002/0191438 A1 * 12/2002 Shukuri ................. G11C 29/70
365/185.05

(Continued)

FOREIGN PATENT DOCUMENTS

| CN | 106257590 A | 12/2016 |
|---|---|---|
| TW | 201734879 A | 10/2017 |
| TW | 201921280 A | 6/2019 |

*Primary Examiner* — Albert Decady
*Assistant Examiner* — Osman M Alschack
(74) *Attorney, Agent, or Firm* — Winston Hsu

(57) ABSTRACT

A built-in self-test (BIST) circuit and a BIST method for Physical Unclonable Function (PUF) quality check are provided. The BIST circuit may include a PUF array, a readout circuit coupled to the PUF array, and a first comparing circuit coupled to the readout circuit. The PUF array may include a plurality of PUF units, wherein each of the PUF units includes a first cell and a second cell. The readout circuit may be configured to output an output bit from the first cell and output a parity bit from the second cell. The first comparing circuit may be configured to compare an output string with a parity string to generate a parity check result, wherein the output string includes output bits respectively read from selected PUF units of the PUF units, and the parity string includes parity bits read from the selected PUF units.

17 Claims, 8 Drawing Sheets

(51) Int. Cl.
*G11C 7/06* (2006.01)
*G06F 11/10* (2006.01)
*H04L 9/32* (2006.01)

(58) Field of Classification Search
CPC ... G11C 29/12005; G11C 29/24; G11C 29/42;
G11C 29/44; G11C 29/50004; G11C
2029/5004; G11C 7/24; G11C 29/12;
H04L 9/3278
USPC .................................................. 714/733, 777
See application file for complete search history.

(56) References Cited

U.S. PATENT DOCUMENTS

| | | | | |
|---|---|---|---|---|
| 2007/0297252 | A1* | 12/2007 | Singh | G01J 3/28 |
| | | | | 714/E11.049 |
| 2008/0313510 | A1* | 12/2008 | Baker | G11C 29/026 |
| | | | | 714/718 |
| 2009/0097345 | A1* | 4/2009 | Kushnarenko | G11C 29/14 |
| | | | | 365/201 |
| 2016/0148664 | A1* | 5/2016 | Katoh | H04L 9/0866 |
| | | | | 365/148 |
| 2016/0148679 | A1* | 5/2016 | Yoshimoto | G11C 13/004 |
| | | | | 365/148 |
| 2016/0148680 | A1* | 5/2016 | Yoshimoto | G11C 13/0059 |
| | | | | 365/148 |
| 2016/0170856 | A1 | 6/2016 | Kim | |
| 2016/0373264 | A1* | 12/2016 | Katoh | H10N 70/24 |
| 2017/0039102 | A1* | 2/2017 | Engin | G06F 11/1012 |
| 2017/0242660 | A1* | 8/2017 | Katoh | H04L 9/0662 |

\* cited by examiner

BUILT-IN SELF-TEST CIRCUIT AND BUILT-IN SELF-TEST METHOD FOR PHYSICAL UNCLONABLE FUNCTION QUALITY CHECK

CROSS REFERENCE TO RELATED APPLICATIONS

This application claims the benefit of U.S. provisional application No. 63/124,085, which was filed on Dec. 11, 2020, and is included herein by reference.

BACKGROUND OF THE INVENTION

1. Field of the Invention

The present invention is related to Physically Unclonable Functions (PUFs), and more particularly, to a built-in self-test (BIST) circuit and a BIST method for PUF quality check.

2. Description of the Prior Art

A Physically Unclonable Function (PUF) may be regarded as an on-chip fingerprint. As physical characteristics of different chips may be slightly different from each other due to some uncontrollable factors in the manufacturing process, these differences are unable to be copied or predicted, and may be utilized as static entropy for security-related applications. In some implementation of a PUF pool, enrollment of some components within this PUF pool may be required, in order to convert some physical features of these components into random bits. The enrollment may be accidently skipped or defective, however. Thus, detection for checking quality of these random bits from the PUF pool may be required, which may greatly increase manufacturing time and labor costs.

Thus, there is a need for a novel method and associated apparatus, to check the quality of the random bits provided by the PUF pool without introducing any side effect or in a way that is less likely to introduce side effects.

SUMMARY OF THE INVENTION

An objective of the present invention is to provide a built-in self-test (BIST) circuit and a BIST method for Physical Unclonable Function (PUF) quality check, in order to improve efficiency of checking the quality of a PUF pool without greatly increase additional costs.

At least one embodiment of the present invention provides a BIST circuit for PUF quality check. The BIST circuit may comprise a PUF array, a readout circuit coupled to the PUF array, and a first comparing circuit coupled to the readout circuit. The PUF array may comprise a plurality of PUF units, wherein each of the PUF units comprises a first cell and a second cell. The readout circuit may be configured to output an output string comprising a plurality of output bits read from the first cells of selected PUF units, and a parity string comprising a plurality of parity bits read from the second cells of the selected PUF units. The first comparing circuit may be configured to generate a parity check result according to a hamming distance between the output string and the parity string.

At least one embodiment of the present invention provides a BIST method for PUF quality check. The BIST method may comprise: utilizing a PUF array to provide PUF values, wherein the PUF array comprises a plurality of PUF units, and each of the PUF units comprises a first cell and a second cell; utilizing a readout circuit to output an output string comprising a plurality of output bits read from the first cells of selected PUF units, and a parity string comprising a plurality of parity bits read from the second cells of the selected PUF units; and utilizing a first comparing circuit to generate a parity check result according to a hamming distance between the output string and the parity string.

At least one embodiment of the present invention provides a BIST circuit for PUF quality check. The BIST circuit may comprise a PUF array and a comparing circuit. The PUF array may comprise a plurality of PUF units. The comparing circuit may be configured to receive a first horizontal string, a first vertical string and a first askew string from the PUF array and calculate a horizontal hamming weight of the first horizontal string, a vertical hamming weight of the first vertical string and an askew hamming weight of the first askew string, and determine whether the horizontal hamming weight, the vertical hamming weight and the askew hamming weight meet a predetermined criteria, in order to generate a health check result.

The embodiments of the present invention provide a BIST circuit and a BIST method, which can check PUF quality with aid of built-in circuits. Thus, external measuring equipment is not required, and testing time costs and labor costs can be greatly reduced. In addition, the embodiments of the present invention will not greatly increase additional hardware. Thus, the present invention can improve the efficiency of checking the PUF quality without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
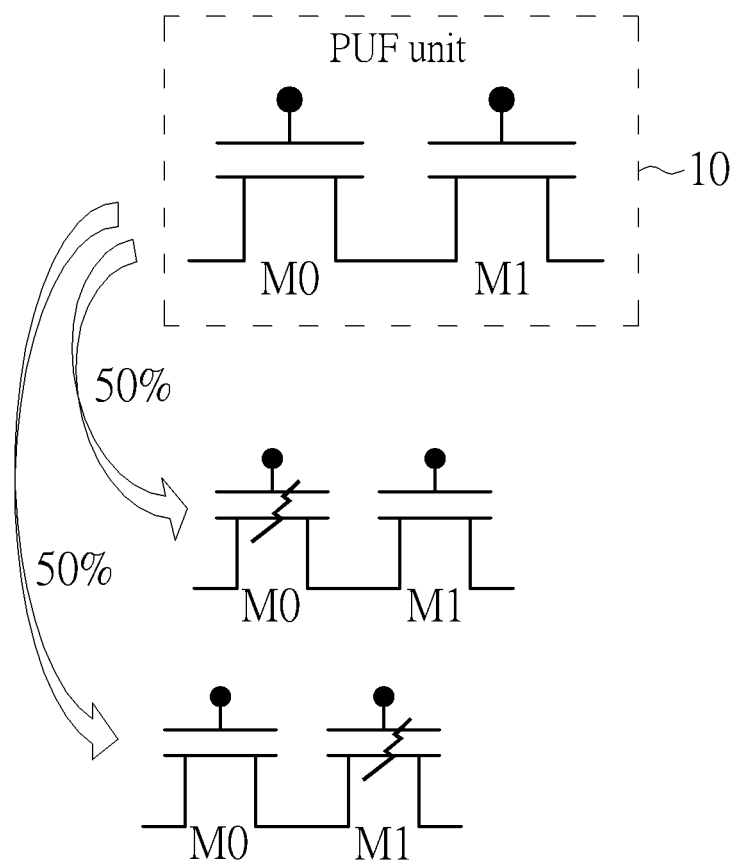
FIG. 1 is a diagram illustrating enrollment of a Physical Unclonable Function (PUF) unit according to an embodiment of the present invention.

FIG. 1 is a diagram illustrating enrollment of a Physical Unclonable Function (PUF) unit 10 (e.g., an anti-fuse based PUF unit) according to an embodiment of the present invention. As shown in FIG. 1, the PUF unit 10 may at least comprise two PUF cells such as a first cell and a second cell, where the first cell may comprise a transistor M0, and the second cell may comprise a transistor M1. In this embodiment, a high voltage may be applied to gate terminals of the transistors M0 and M1 so that the transistors M0 and M1 are being enrolled simultaneously, which means that the transistors M0 and M1 are initialized to generate a random code. In detail, after energy accumulated on the gate terminals of the transistors M0 and M1 reaches a certain level, quantum-tunneling may occur on one of the transistors M0 and M1. The energy accumulated on the gate terminals of the transistors M0 and M1 will be released via a gate leakage path of which undergoing quantum-tunneling. Thus, one of the transistors M0 and M1 (e.g., the transistor M0) would generate a quantum-tunneling current higher than a predetermined threshold value, and the other one of the transistors M0 and M1 (e.g., the transistor M1) would generate a quantum-tunneling current lower than the predetermined threshold value or would not undergo quantum-tunneling. The mechanism of quantum-tunneling mentioned above may be similar to a gate oxide breakdown, but is not limited to a hard/destructive breakdown. For example, the quantum-tunneling may be a soft breakdown that leverages trap-assisted tunneling, but the present invention is not limited thereto. For better comprehension, the transistor which generates a quantum-tunneling current higher than the predetermined threshold value may be referred to as being "ruptured", and the transistor which generates a quantum-tunneling current lower than the predetermined threshold value (or does not undergo the quantum-tunneling) may be referred to as being "unruptured". In this embodiment, the mechanism of quantum-tunneling occurring on the transistor M0 and/or the transistor M1 has intrinsic randomness. In addition, the transistors M0 and M1 are not perfectly symmetric or identical on physical characteristics due to process variation. Thus, which one of the transistors M0 and M1 would be ruptured can be random. For example, the transistor M0 and M1 may have the same probability (e.g., 50% each) to be the ruptured one, but the present invention is not limited thereto.

Figure 2:
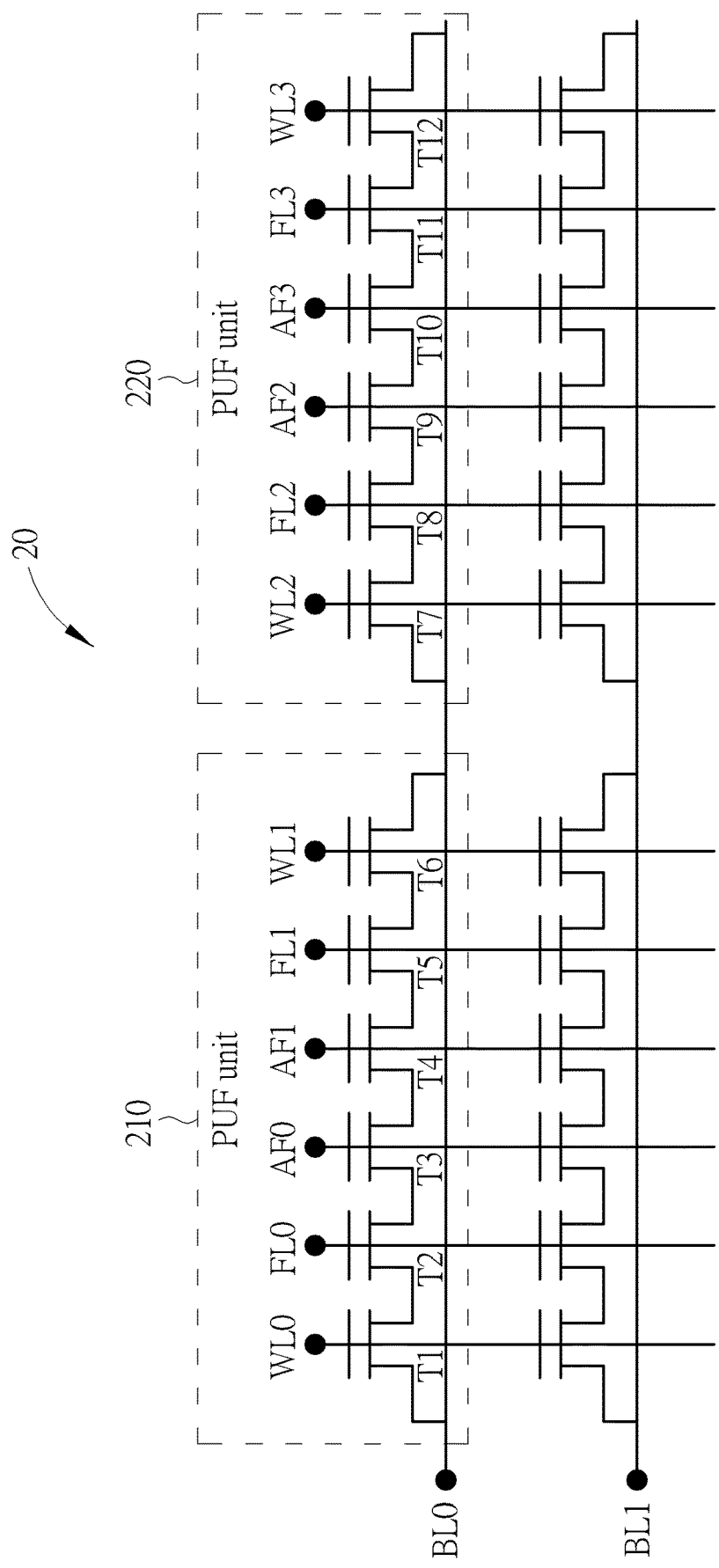
FIG. 2 is a diagram illustrating a PUF array according to an embodiment of the present invention.

FIG. 2 is a diagram illustrating a PUF array 20 according to an embodiment of the present invention. In this embodiment, the PUF array 20 shows a two-by-two PUF array for illustrative purposes only, and is not meant to be a limitation of the present invention. A PUF array with a different size may be deduced by analogy. In this embodiment, each PUF unit of the PUF array 20 may comprise six transistors connected in series, where the enrollment illustrated in the embodiment of FIG. 1 may be adopted, and more particularly, may be applied to each PUF unit of the PUF array 20. For example, a PUF unit 210 may comprise transistors T1~T6 connected in series, where gate terminals of the transistors T1~T6 are respectively connected to a word line WL0, a following line FL0, a control line AF0, a control line AF1, a following line FL1 and a word line WL1. In addition, a PUF unit 220 may comprise transistors T7~T12 connected in series, where gate terminals of the transistors T7~T12 are respectively connected to a word line WL2, a following line FL2, a control line AF2, a control line AF3, a following line FL3 and a word line WL3. In this embodiment, the transistors T3 and T4 of the PUF unit 210 may be examples of the transistors M0 and M1 shown in FIG. 1, respectively, and the transistors T9 and T10 of the PUF unit 220 may be examples of the transistors M0 and M1 shown in FIG. 1, respectively.

As shown in FIG. 2, a first group of PUF units (e.g., the PUF units shown in an upper-half portion of FIG. 2) of the PUF array 20 is coupled to a bit line BL0, and a second group of PUF units (e.g., the PUF units shown in a lower-half portion of FIG. 2) of the PUF array 20 is coupled to a bit line BL1. The following description focuses on operations of the first group of PUF units (e.g., the PUF units 210 and 220) for brevity, where similar details of the second group of PUF units may be deduced by analogy. For the PUF unit 210, the transistors T3 and T4 may be regarded as two resistors having different resistance after the enrollment, where the ruptured one may have a relative low resistance corresponding to a relative high gate leakage current, and the unruptured one (e.g., the one which is not ruptured) may have a relative high resistance corresponding to a relative low gate leakage. The transistors T1 and T6 are configured to control readout of PUF data, and the transistors T2 and 5 are configured to prevent the transistors T1 and T6 from being damaged (e.g., to ensure that a voltage difference across each of the transistors T1 and T6 falls in a tolerable range) during the enrollment of the transistors T3 and T4. In some other embodiments, the transistors T2 and T5 can be omitted, which means that the transistor T1 can be directly connected to the transistor T3 and the transistor T6 can be directly connected to the transistor T4. Related details of the PUF unit 220 are similar to the PUF unit 210, and are therefore omitted here for brevity.

TABLE 1

|  | AF0 | AF1 | FL0 | FL1 | WL0 | WL1 | BL0 |
| --- | --- | --- | --- | --- | --- | --- | --- |
| Enrollment | VPP | VPP | VX | VX | VPR | VPR | 0 |
| Data Extraction (M0) | VSEN | 0 | VDD | 0 | VDD | 0 | 0 |
| Data Extraction (M1) | 0 | VSEN | 0 | VDD | 0 | VDD | 0 |

Table 1 shows the control of transistors within a selected PUF unit such as the PUF unit 210 (e.g., voltages applied to the gate terminals thereof such as voltages applied to the word line WL0, the following line FL0, the control line AF0, the control line AF1, the following line FL1 and the word line WL1) when performing the enrollment and data extraction. Assume that the PUF unit 210 is selected and the PUF unit 220 is unselected, where a zero voltage (e.g., ground voltage) may be applied to gate terminals of all transistors within the unselected PUF unit (e.g., the transistors T7~T12 within the PUF unit 220) to disable the unselected PUF unit, but the present invention is not limited thereto. During the enrollment of the PUF unit 210, a voltage VPP is applied to the control lines AF0 and AF1, a voltage VX may be applied to the following lines FL0 and FL1, and a voltage VPR may be applied to the word lines WL0 and WL1, where the zero voltage (labeled "0" in Table 1) is applied to the bit line BL0. Assume that the transistor T3 is ruptured and the transistor T4 is unruptured (e.g., not ruptured) after the enrollment of the PUF unit 210. To extract data from the transistor T3 of the PUF unit 210 (labeled "Data Extraction (M0)" in Table 1), a sensing voltage VSEN may be applied to the control line AF0 and the zero voltage (labeled "0" in Table 1) may be applied to the control line AF1, where a voltage VDD is applied to the word line WL0 and the following line FL0, the zero voltage is applied to the word line WL1 and the following line FL1, and the zero voltage is applied to the bit line BL0. Due to a relative high gate leakage current from the ruptured transistor T3, a relative high readout voltage may be detected on the bit line BL0, and the data from the transistor T3 of the PUF unit 210 can be determined as a logic value "0". To extract data from the transistor AF1 of the PUF unit 210 (labeled "Data Extraction (M1)" in Table 1), the sensing voltage VSEN may be applied to the control line AF1 and the zero voltage may be applied to the control line AF0, where the voltage VDD is applied to the word line WL1 and the following line FL1, the zero voltage is applied to the word line WL0 and the following line FL0, and the zero voltage is applied to the bit line BL0. Due to a relative low gate leakage current from the unruptured transistor AF1, a relative low readout voltage may be detected on the bit line BL0, and the data from the transistor AF1 of the PUF unit 210 can be determined as a logic value "1". For a condition where the transistor T3 is unruptured and the transistor T4 is ruptured after the enrollment of the PUF unit 210, the operation of data extraction may be deduced by analogy, and is omitted here for brevity. The data extraction scheme mentioned above may be referred to as a single-ended sensing scheme. In other words, the data extraction of the transistor T3 and the transistor T4 are operated respectively. Related details of a condition of selecting the PUF unit 220 may be deduced by analogy, and are therefore omitted here for brevity.

Figure 3:
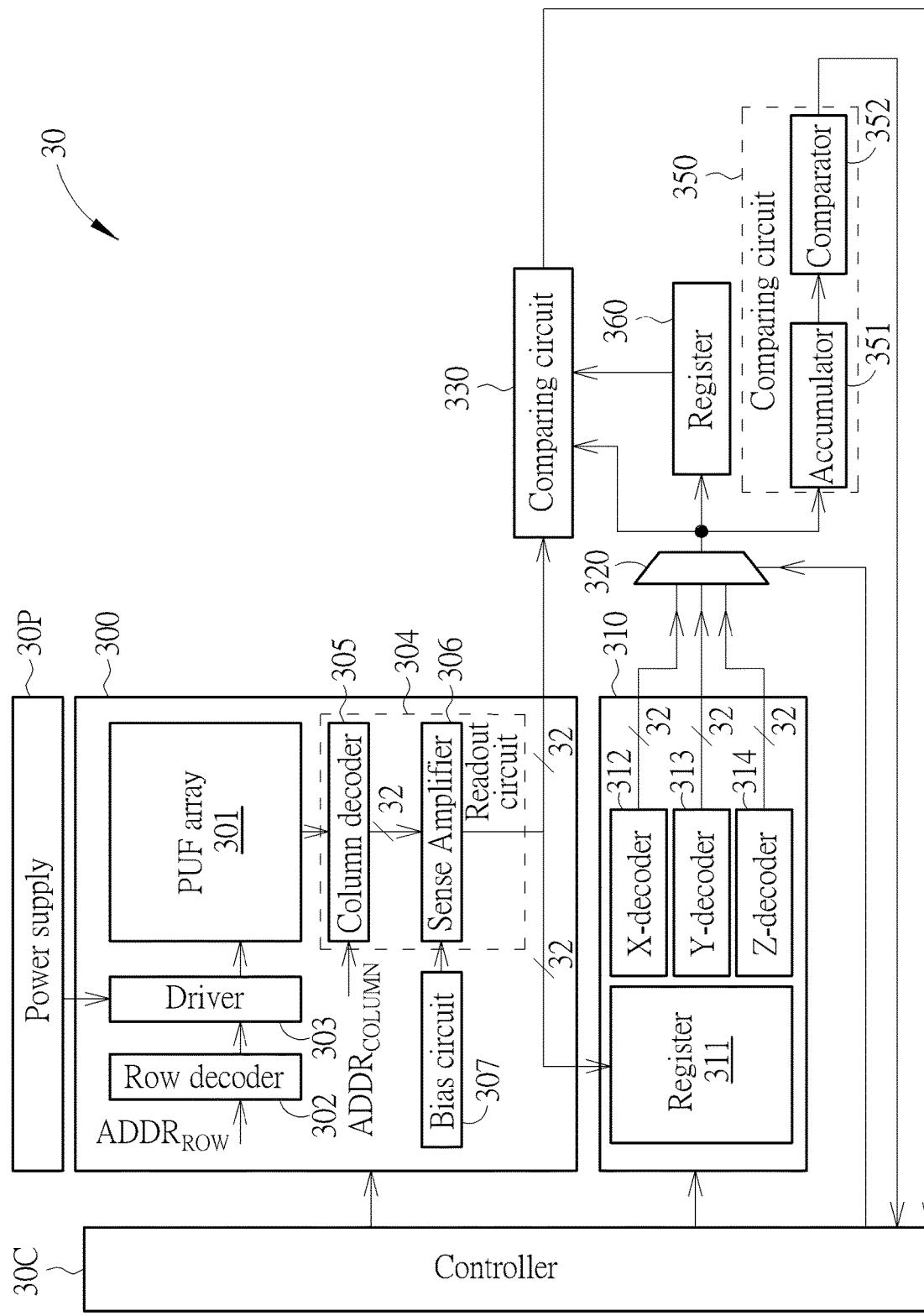
FIG. 3 is a diagram illustrating a built-in self-test (BIST) circuit for PUF quality check according to an embodiment of the present invention.

FIG. 3 is a diagram illustrating a built-in self-test (BIST) circuit 30 for PUF quality check according to an embodiment of the present invention. In this embodiment, the BIST circuit 30 may comprise a power supply 30P, a controller 30C, and a PUF device 300 coupled to the power supply 30P and the controller 30C. The power supply 30 may be a high voltage system which is configured to provide power to components within the BIST circuit 30. The controller 30C may be configured to control a working flow of BIST operations. The PUF device 300 may comprise a PUF array 301, a row decoder 302, a driver 303 coupled between the PUF array 301 and the row decoder 302, and a readout circuit 304 coupled to the PUF array 301, where the readout circuit 304 may comprise a column decoder 305 coupled to the PUF array 301, and a sense amplifier 306 coupled to the column decoder 305. The PUF device 300 may further comprise a bias circuit 307 coupled to the sense amplifier 306 within the readout circuit 304. In this embodiment, the PUF array 301 may comprise a plurality of PUF units, each of the PUF units may comprises a first cell comprising the transistor M0 and a second cell comprising the transistor M1 shown in FIG. 1. In detail, the first cell may comprise the transistors T1~T3 of the PUF unit 210 shown in FIG. 2 (or the transistors T7~T9 of the PUF unit 220 shown in FIG. 2), and the second cell may comprise the transistors T4~T6 of the PUF unit 210 shown in FIG. 2 (or the transistors T10~T12 of the PUF unit 220 shown in FIG. 2), but the present invention is not limited thereto.

Under an ideal condition, for the transistors M0 (e.g., the transistor T3 of the PUF unit 210 or the transistor T9 of the PUF unit 220) and M1 (e.g., the transistor T4 of the PUF unit 210 or the transistor T10 of the PUF unit 220) of each PUF unit within the PUF array 301, one of them is ruptured and the other one of them is unruptured after the enrollment. Thus, data extracted from the transistor M0 (which is referred to as "output bit") and data extracted from the transistor M1 (which is referred to as "parity bit") are expected to have opposite logic values (e.g., if one of them is "1", the other would be "0") for a single PUF unit. In practice, the enrollment of one or more PUF units within the PUF array 301 may be defective. For example, both of the transistors M0 and M1 within a single PUF unit are ruptured, which causes that both of the output bit and the parity bit are "0". In another example, both of the transistors M0 and M1 within a single PUF unit are unruptured, which causes that both of the output bit and the parity bit are "1".

The readout circuit 304 may be configured to output an output bit from the first cell such as the transistor M0 and output a parity bit from the second cell such as the transistor M1. In particularly, the row decoder 302 may generate control signals for selecting a row of PUF units according to a row address $ADDR_{ROW}$, and the driver 303 may drive the PUF array 301 (e.g., driving the transistors WL0 and WL1 shown in FIG. 2) with driving voltages provided by the power supply 30P according to the control signals, in order to allow the readout circuit 304 to extract data (e.g., the output bit and/or the parity bit) from each PUF units of the selected row of PUF units. In addition, the column decoder 305 may be configured to select at least one column of PUF units according to a column address $ADDR_{COLUMN}$ for sensing readout voltages from at least one selected PUF units of the PUF array 301, and the sense amplifier 304 may be configured to determine a logic value of data from the selected PUF unit as "0" or "1", where the sense amplifier 304 may operates according to bias voltage(s) provided by the bias circuit 307. For better comprehension, a 32×32 PUF array can be taken as an example of the PUF array 301 in this embodiment, but the present invention is not limited thereto. It should be noted that the PUF array 301 does not have to be a square array (e.g., the number of rows may be different from the number of columns in the PUF array 301), and the column decoder 305 does not have to select a whole column of PUF units for readout. In some embodiments, the PUF array 301 may be a 2×512 PUF array, where the row decoder 302 may select one row of PUF units (e.g., 512 PUF units) from this 2×512 PUF array, and the column decoder 305 may merely select 32 PUF units from the 512 PUF units for extracting 32-bit data, but the present invention is not limited thereto.

Figure 4:
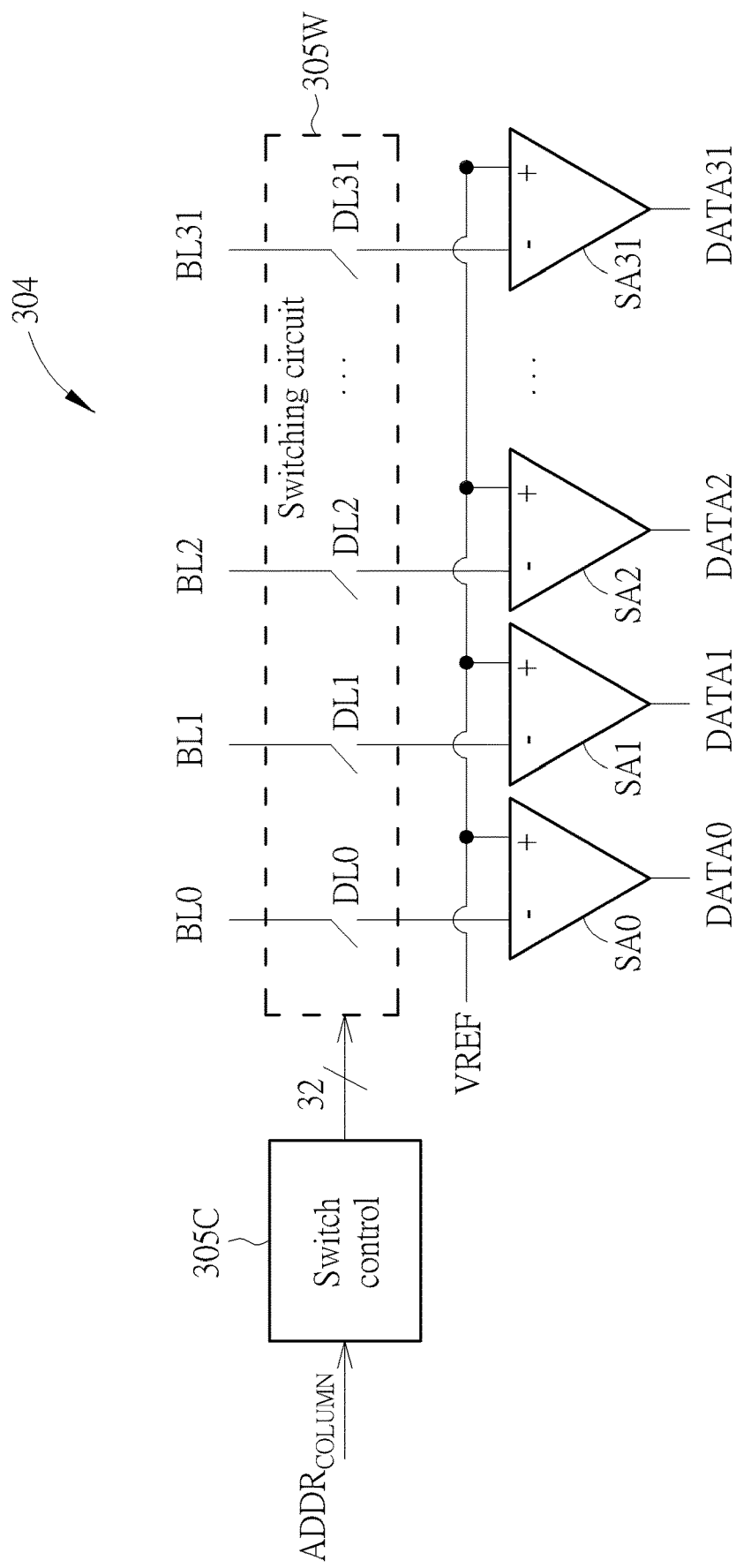
FIG. 4 illustrates some details of a readout circuit shown in FIG. 3 according to an embodiment of the present invention.

FIG. 4 illustrates some details of the readout circuit 304 (e.g., the column decoder 305 and the sense amplifier 306 therein) according to an embodiment of the present invention. In this embodiment, the column decoder 305 shown in FIG. 3 may comprise a switch control circuit 305C (labeled "Switch control" for brevity) and a switching circuit 305W, where the switching circuit 305W may comprise a plurality of switches such as DL0, DL1, DL2, . . . and DL31, and the switch control circuit 305C may generate 32 switch control signals respectively for controlling the switches DL0, DL1, DL2, . . . and DL31 according to the column address $ADDR_{COLUMN}$. In addition, the sense amplifier 306 shown in FIG. 3 may be configured to output the output bit according to a readout voltage read from the transistor M0 of the selected PUF unit and output the parity bit according to a readout voltage read from the transistor M1 of the selected PUF unit. More particularly, the sense amplifier 306 shown in FIG. 3 may comprise one or more amplifier circuit such as SA0, SA1, SA2, . . . and SA31. In this embodiment, the switch DL0 may be coupled between a bit line BL0 of the PUF array 301 and the amplifier circuit SA0; the switch DL1 may be coupled between a bit line BL1 of the PUF array 301 and the amplifier circuit SA1; the switch DL2 may be coupled between a bit line BL2 of the PUF array 301 and the amplifier circuit SA2; and the rest can be deduced by analogy, for example, the switch DL31 may be coupled between a bit line BL31 of the PUF array 301 and the amplifier circuit SA31; but the present invention is not limited thereto. In some embodiment, the switching circuit 305W may comprise two or more layers of switches in order to implement a more flexible switch control scheme, but the present invention is not limited thereto.

In the embodiment of FIG. 4, each of the amplifier circuit SA0, SA1, SA2, . . . and SA31 may operate as a comparator. The amplifier circuit SA0 can be taken as an example in the following description, where operations of the others such as the amplifier circuit SA1, SA2, . . . and SA31 is similar to the amplifier circuit SA0, and are therefore omitted here for brevity. When the readout voltage from the selected PUF unit (e.g., the transistors M0 therein) is less than a reference voltage VREF, a difference between the readout voltage and the reference voltage VREF may be amplified to make an output of the amplifier circuit SA0 be a high voltage (e.g., the voltage VDD), and the output bit may be determined to have a first logic value such as "1". When the readout voltage from the selected PUF unit (e.g., the transistors M0 therein) is greater than the reference voltage VREF, a difference between the readout voltage and the reference voltage VREF may be amplified to make the output of the amplifier circuit SA0 be a low voltage (e.g., the zero voltage), and the output bit may be determined to have a second logic value such as "0". The operation of extracting the parity bit from the transistor M1 via the sense amplifier 306 is similar to the operation of extracting the output bit from the transistor M0, and related detail is omitted here for brevity.

For a purpose of checking the quality of the PUF device 300 (more particularly, the PUF array 301 therein), the BIST circuit 30 may be configured to check authenticity, reliability and randomness of PUF data provided by the PUF device 300. In addition to the aforementioned components, the BIST circuit 30 may further comprise a temporarily storage device 310 coupled to the PUF device 300, a multiplexer (MUX) 320 coupled to the temporarily storage device 310, a comparing circuit 330 coupled to the PUF device and the MUX 320, a comparing circuit 350 coupled to the multiplexer 320, and a register 360 coupled to the MUX 320 and the comparing circuit 330, as shown in FIG. 3. More particularly, the temporarily storage device 310 may comprise a register 311 coupled to the PUF device 300, a horizontal decoder such as an X-decoder 312 coupled between the register 311 and the MUX 320, a vertical decoder such as a Y-decoder 313 coupled between the register 311 and the MUX 320, and an askew decoder such as a Z-decoder 314 coupled between the register 311 and the MUX 320. The MUX 320 is configured to select one of the X-decoder 312, the Y-decoder 313 and the Z-decoder 314 for output data/string from the register 311.

In this embodiment, 32-bit data (e.g., data from one row of PUF units of the PUF array 301) may be extracted from the PUF device 300 and stored into the register 311 at a time, but the present invention is not limited thereto, and all PUF data (e.g., 32×32 output bits extracted from the PUF device 300) within the PUF array 301 can be dumped into the register 311 after performing the data extraction on all rows of PUF units of the PUF array 301, but the present invention is not limited thereto. In addition, the X-decoder 312 may be configured to extract data from the register 311, in order to generate a horizontal string by grouping the output bits which is read from a group of horizontal PUF units within the PUF array 301, where PUF units within the group of horizontal PUF units are arranged in a horizontal direction. The Y-decoder 313 may be configured to extract data from the register 311, in order to generate a vertical string by grouping the output bits which is read from a group of vertical PUF units within the PUF array 301, where PUF units within the group of vertical PUF units are arranged in a vertical direction. The Z-decoder 314 may be configured to extract data from the register 311, in order to generate an askew string by grouping the output bits which is read from a group of askew PUF units within the PUF array 301, where PUF units within the group of askew PUF units are arranged in an askew direction.

Figure 5:
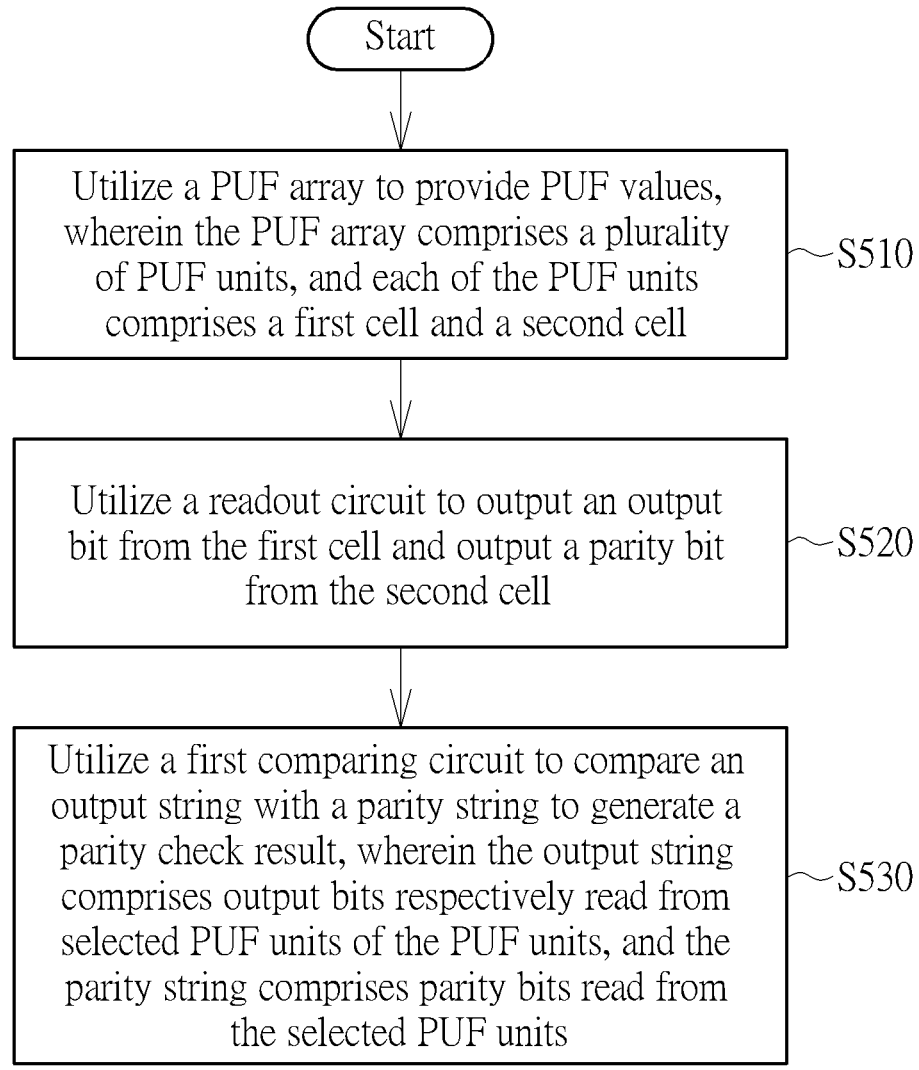
FIG. 5 is a diagram illustrating a working flow of a BIST method for PUF quality check according to an embodiment of the present invention.

FIG. 5 is a diagram illustrating a working flow of a BIST method for PUF quality check according to an embodiment of the present invention, where the working flow shown in FIG. 5 may be performed by the BIST circuit 30 shown in FIG. 3. It should be noted that the working flow shown in FIG. 5 is for illustrative purposes only, and is not meant to be a limitation of the present invention. In addition, one or more steps may be added, deleted or modified in the working flow. If a same result can be obtained, these steps do not have to be executed in the exact order shown in FIG. 5. For better comprehension, please refer to FIG. 5 in conjunction with FIG. 3.

In Step S510, the BIST circuit 30 may utilize the PUF array 301 to provide PUF values, wherein the PUF array 301 comprises a plurality of PUF units (e.g., 32×32 PUF units), and each of the PUF units may comprise a first cell such as the transistor M0 and a second cell such as the transistor M1.

In Step S520, the BIST circuit 30 may utilize the readout circuit 304 to output an output bit from the first cell such as the transistor M0 and output a parity bit from the second cell such as the transistor M1.

In Step S530, the BIST circuit 30 may utilize the comparing circuit 330 to compare an output string with a parity string to generate a parity check result, wherein the output string comprises output bits respectively read from selected PUF units of the PUF units, and the parity string comprises parity bits read from the selected PUF units.

In detail, when a first row of the PUF units within the PUF array 301 is selected, the MUX 320 may select the X-decoder 312 to output an output string from a first row of storage units within the register 311, where the output bits within the output string are extracted from the first row of the PUF units. The readout circuit 304 may output a parity string from the first row of PUF units, where the parity bits within the parity string are extracted from the first row of the PUF units. For each PUF unit of the first row of PUF units, the comparing circuit 330 (e.g., a 32-bit comparing circuit) may check whether the output bit and the parity bit of said each PUF unit have opposite logic values to generate a comparison result, where the comparing circuit 330 may include exclusive-OR (XOR) logic circuits, which compare two strings bit by bit. The comparison result can indicate which PUF unit within the first row of PUF units passes the parity check (i.e., the output bit and the parity bit have the opposite logic values). The comparing circuit 330 may comprise a counter to count how many PUF units in the first row of PUF units pass the parity check. For example, the counter of the comparing circuit 330 may calculate a hamming distance between the output string and the parity string as a parity check result of the first row of PUF units, and may return this parity check result to the controller 30C for further determination. The parity check regarding other rows of the PUF units within the PUF array 301 may be deduced by analogy, and related details are omitted here for brevity.

Figure 6:
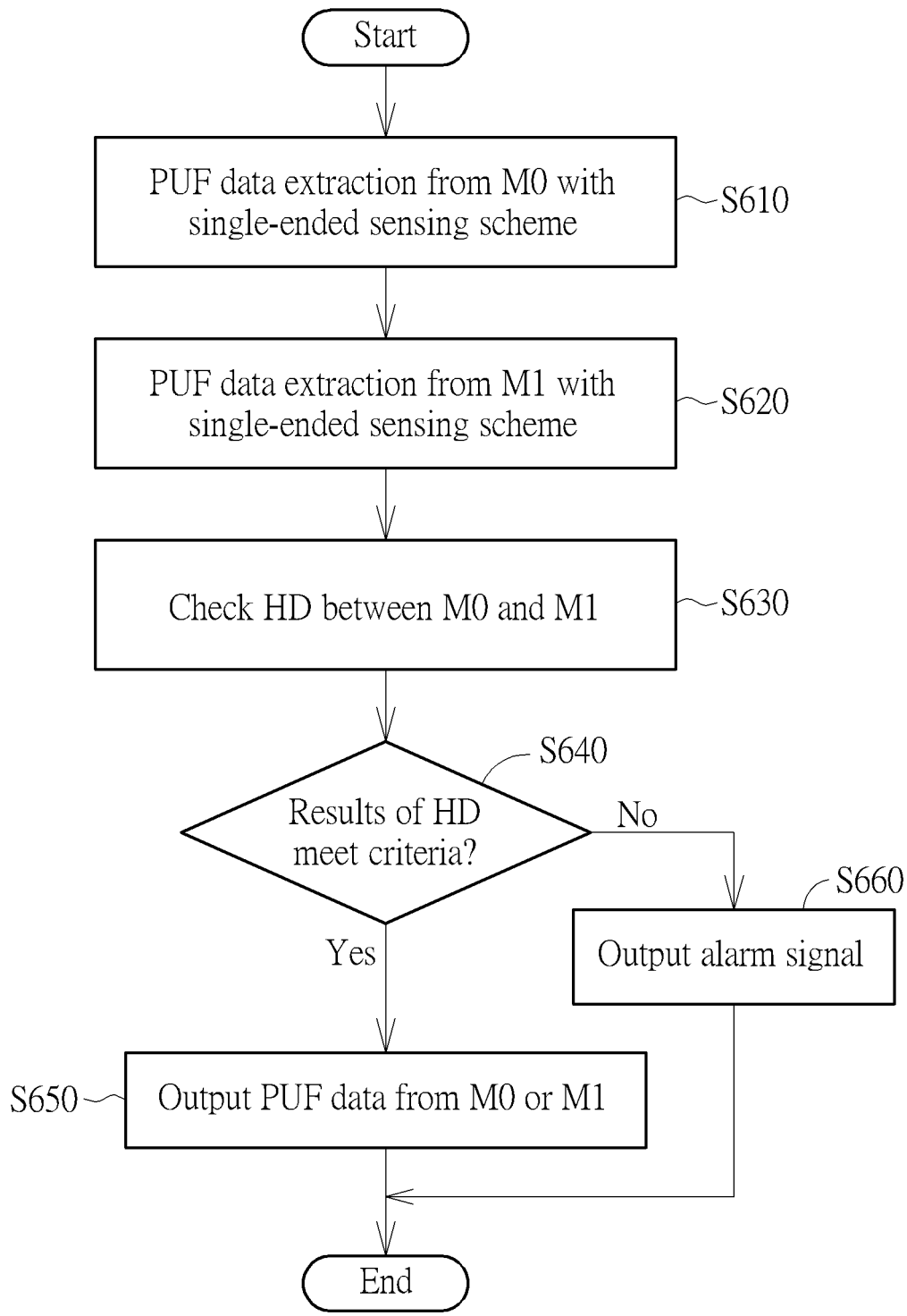
FIG. 6 is a diagram illustrating a working flow of parity check regarding one group of PUF units within a PUF array according to an embodiment of the present invention.

For better comprehension of the parity check mentioned above, please refer to FIG. 6, which is a diagram illustrating a working flow of the parity check regarding one group of PUF units within the PUF array 301 according to an embodiment of the present invention. It should be noted that the working flow shown in FIG. 6 is for illustrative purposes only, and is not meant to be a limitation of the present invention. In addition, one or more steps may be added, deleted or modified in the working flow. If a same result can be obtained, these steps do not have to be executed in the exact order shown in FIG. 6.

In Step S610, PUF data (e.g., the output bit) is extracted from the transistor M0 (referred to as "PUF data extraction from M0" in FIG. 6 for brevity) with the single-ended sensing scheme.

In Step S620, PUF data (e.g., the parity bit) is extracted from the transistor M1 (referred to as "PUF data extraction from M1" in FIG. 6 for brevity) with the single-ended sensing scheme.

In Step S630, the BIST circuit 30 (e.g., the comparing circuit 330) checks a hamming distance (referred to as "HD" in FIG. 6 for brevity) between the PUF data from the transistor M0 and the PUF data from the transistor M1.

In Step S640, the controller 30C may determine whether calculating results of the hamming distance (e.g., whether a parity check result indicating the hamming distance) meet a predetermined criteria (e.g., whether the hamming distance is greater than a predetermine value). For example, when the output bits and the parity bits are 32-bit string, the predetermine value can be set as 30. If the determination result shows "Yes", the working flow proceeds with Step S650; and if the determination result shows "No", the working flow proceeds with Step S660. For example, regarding a single row of PUF units within the PUF array 301, the controller 30C may determine whether a calculating result of the hamming distance corresponding to this single row of PUF units meets the criteria. In another example, after the calculating results of the hamming distance respectively corresponding to all rows of PUF units within the PUF array 301, the controller 30C may determine whether the whole PUF array 301 meets the criteria according to a summary of these calculating results.

In Step S650, the BIST circuit 30 may utilize the PUF device 300 to output the PUF data from the transistor M0 or M1. For example, the PUF data is only extracted from the transistor M0 when utilizing the PUF data as a final random code, and would not be extracted from the transistor M1 (e.g., only the output bits are output from the PUF array 301, and the parity bits would not be output). In another example, the PUF data is only extracted from the transistor M1 when utilizing the PUF data as the final random code, and would not be extracted from the transistor M0 (e.g., only the parity bits are output from the PUF array 301, and the output bits would not be output).

In Step S660, the BIST circuit 30 may output an alarm signal to inform a user or an electronic device coupled to the BIST circuit 30 that the parity check of the PUF device 300 is failed to meet the criteria.

In the above description, one row of PUF units can be taken as an example of units for performing the parity check, but the present invention is not limited thereto. In other embodiment, a different number of PUF units may be grouped to be a unit for performing the parity check mentioned above, and the number of bits of the comparing circuit 330 may accordingly vary. As mentioned above, the output bit and the parity bit read from a same PUF unit are expected to have opposite logic value. In practice, when the number of defective PUF units within the PUF array 301 is less than a tolerable number, the PUF array 301 may still be regarded as passing the parity check. Thus, detailed implementation of the criteria of specifying whether the PUF array 301 pass the parity check may vary according to the requirement of the manufacturer, and is not limited to any specific rule of the above description.

Figure 7:
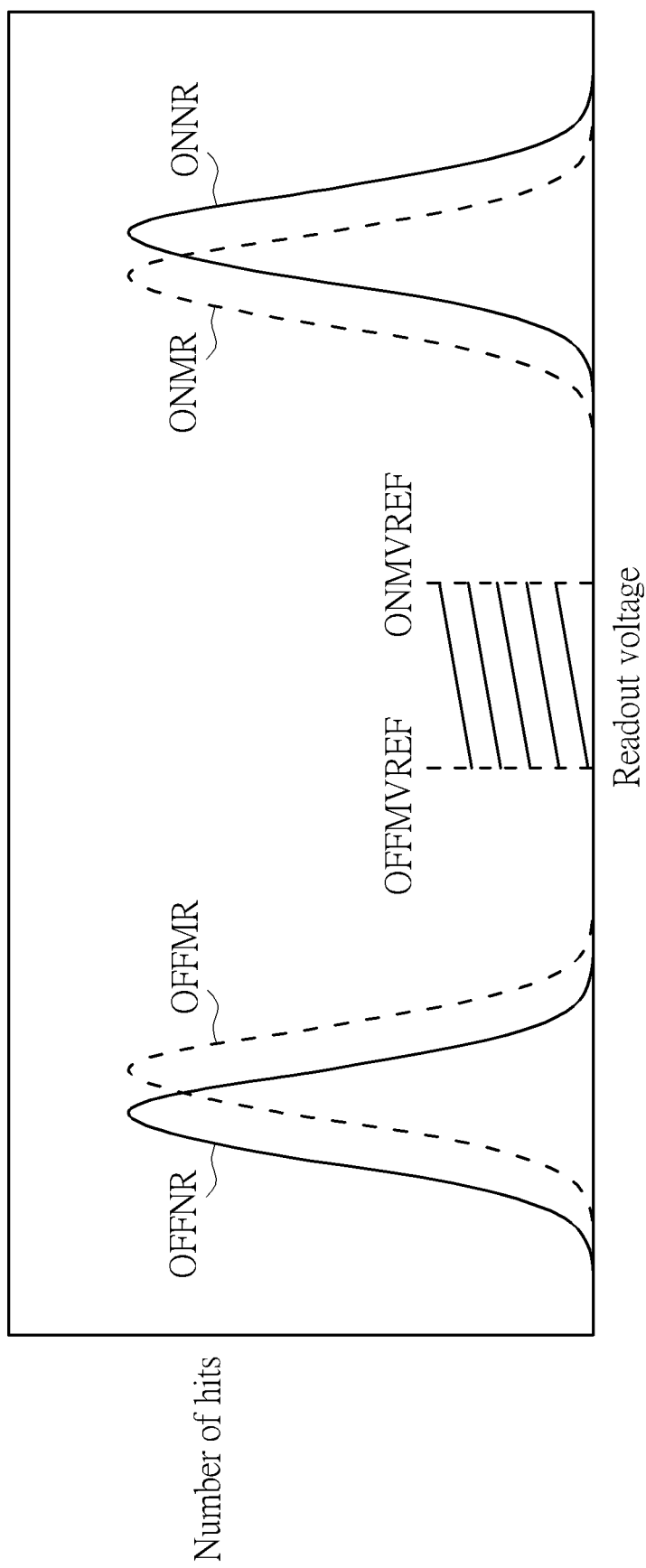
FIG. 7 is a diagram illustrating distribution of readout voltages from each PUF unit within a selected group of PUF units within a PUF array according to an embodiment of the present invention.

FIG. 7 is a diagram illustrating distribution of readout voltages (or readout current) from each PUF unit within a selected group of PUF units within the PUF array 301 according to an embodiment of the present invention, where the horizontal axis of FIG. 7 represents the readout voltage (or the readout current) from the transistor M0 or M1, and the vertical axis of FIG. 7 represent a number of hits corresponding to these readout voltages. When the sensing voltage VSEN is set to a normal sensing level $V_{NS}$ and the reference voltage VREF is set to a normal reference level $V_{NR}$, the distribution of the readout voltages from the ruptured transistors within the selected group of PUF units may be illustrated by ON normal read (ONNR), and the distribution of the readout voltages from the unruptured transistors within the selected group of PUF units may be illustrated by OFF normal read (OFFNR) shown in FIG. 7. In order to check the reliability of the PUF device 300, the BIST circuit 30 may shift the sensing voltage VSEN or the reference voltage VREF to make the readout operation more critical, and if the data extracted from the selected group of PUF units is unchanged, it means this shifting of the sensing voltage VSEN or the reference voltage VREF is tolerable.

In one embodiment, the BIST circuit 30 may shift the reference voltage VREF by an offset voltage $\Delta V_R$ to an ON-margin level ONMVREF (e.g., ONMVREF=$V_{NR}$+$\Delta V_R$), which makes the operation of determining the readout voltage from the ruptured transistor as "0" become more critical. Under the condition where the reference voltage VREF is set to the ON-margin level ONMVREF, all PUF data (e.g., 32×32 output bits extracted from the PUF device 300) within the PUF array 301 can be dumped into the register 311 first. When a first row of the PUF units within the PUF array 301 is selected, the MUX 320 may select the X-decoder 312 to output a reference voltage ON-margin string from a first row of storage units within the register 311, where the output bits within the reference voltage ON-margin string are extracted from the first row of the PUF units. The BIST circuit 30 may further shift the reference voltage VREF by the offset voltage $\Delta V_R$ to an OFF-margin level OFFMVREF (e.g., OFFMVREF=$V_{NR}$−$\Delta V_R$), which makes the operation of determining the readout voltage from the unruptured transistor as "1" become more critical. The readout circuit 304 may output a reference voltage OFF-margin string from the first row of PUF units, where the output bits within the reference voltage OFF-margin string are extracted from the first row of the PUF units. The comparing circuit 330 may check whether the reference voltage ON-margin string is identical to the reference voltage OFF-margin string, in order to generate a reference voltage margin check result, where the ON-margin level ONMVREF is greater than the OFF-margin level OFFMVREF. The comparing circuit 330 may comprise a counter to count how many PUF units in the first row of PUF units pass the margin check. For example, the counter of the comparing circuit 330 may generate the reference voltage margin check result, which indicates how many PUF units in the first row of PUF units are capable of tolerating this shifting amount (i.e., offset voltage $\Delta V_R$), and may return the reference voltage margin check result to the controller 30C for further determination. For example, when the reference voltage margin check result indicates that the reference voltage ON-margin string is identical to the reference voltage OFF-margin string, the controller 30C may determine that the first row of PUF units passes the reference voltage margin check.

In one embodiment, the BIST circuit 30 may shift the sensing voltage VSEN by an offset voltage $\Delta V_S$ to an ON-margin level $V_{ONMS}$ (e.g., $V_{ONMS}=V_{NS}-\Delta V_S$), which makes the distribution of the readout voltages from the ruptured transistors be shifted leftward to a distribution labeled ONMR shown in FIG. 7, and the operation of determining the readout voltage from the ruptured transistor as "0" becomes more critical. Under the condition where the sensing voltage VSEN is set to the ON-margin level $V_{ONMS}$, all PUF data (e.g., 32×32 output bits extracted from the PUF device 300) within the PUF array 301 can be dumped into the register 311 first. When a first row of the PUF units within the PUF array 301 is selected, the MUX 320 may select the X-decoder 312 to output a sensing voltage ON-margin string from a first row of storage units within the register 311, where the output bits within the sensing voltage ON-margin string are extracted from the first row of the PUF units. The BIST circuit 30 may further shift the sensing voltage VSEN by the offset voltage $\Delta V_S$ to an OFF-margin level $V_{OFFMS}$ (e.g., $V_{OFFMS}V_{NS}+\Delta V_S$), which makes the distribution of the readout voltages from the unruptured transistors be shifted rightward to a distribution labeled OFFMR shown in FIG. 7, and the operation of determining the readout voltage from the unruptured transistor as "1" becomes more critical. The readout circuit 304 may output a sensing voltage OFF-margin string from the first row of PUF units, where the output bits within the sensing voltage OFF-margin string are extracted from the first row of the PUF units. The comparing circuit 330 may check whether the sensing voltage ON-margin string is identical to the sensing voltage OFF-margin string, in order to generate a sensing voltage margin check result, where the ON-margin level $V_{ONMS}$ is less than the OFF-margin level $V_{OFFMS}$. The operation of the counter of the comparing circuit 330 related to the sensing voltage margin check result is similar to that related to the reference voltage margin check result, and is not repeated here for brevity.

It should be noted that the margin check (e.g., the reference margin check and the sensing voltage margin check) regarding other rows of the PUF units within the PUF array 301 may be deduced by analogy, and related details are omitted here for brevity. In addition, in the above description, one row of PUF units can be taken as an example of units for performing the margin check, but the present invention is not limited thereto. In other embodiment, a different number of PUF units may be grouped to be a unit for performing the margin check mentioned above, and the number of bits of the comparing circuit 330 may accordingly vary. In addition, detailed implementation of the criteria (e.g., the allowable number of PUF units which is unable to tolerate the shifting of the sensing voltage or the reference voltage) for determining whether the PUF array 301 passes the margin check may vary according to the requirement of the manufacturer, and is not limited to any specific rule of the above description. In some embodiment, when the margin check (e.g., any of the reference margin check and the sensing voltage margin check) is failed, the controller 30C may reduce the offset voltages $\Delta V_R$ and/or $\Delta V_S$ until the PUF array 301 passes the margin check, and a corresponding level of reliability of the PUF array 301 may be estimated according to the reduced offset voltages $\Delta V_R$ and/or $\Delta V_S$, but the present invention is not limited thereto.

Figure 8:
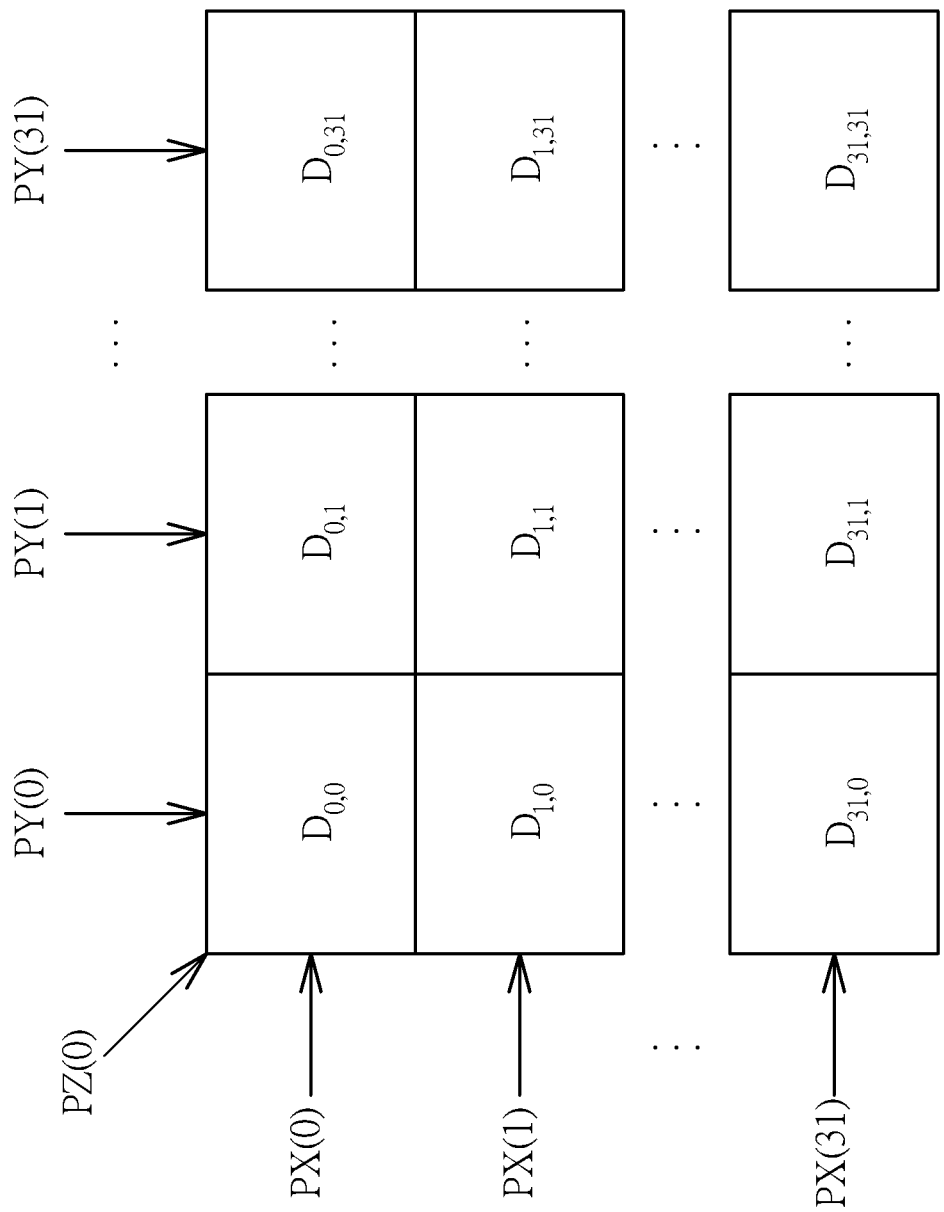
FIG. 8 is a diagram illustrating a decoding scheme of a PUF array according to an embodiment of the present invention.

FIG. 8 is a diagram illustrating a decoding scheme of the PUF array 301 according to an embodiment of the present invention. All PUF data (e.g., 32×32 output bits extracted from the PUF device 300) within the PUF array 301 can be dumped into the register 311. For better comprehension, data stored in the register 311 may be illustrated by $D_{RA,CA}$, where RA may represent a row address, and CA may represent a column address. For example, data stored in the first row of the register 311 may be $\{D_{0,0}, D_{0,1}, D_{0,2}, \ldots, D_{0,30}, D_{0,31}\}$; data stored in the second row of the register 311 may be $\{D_{1,0}, D_{1,1}, D_{1,2}, \ldots, D_{1,30}, D_{1,31}\}$; data stored in the third row of the register 311 may be $\{D_{2,0}, D_{2,1}, D_{2,2}, \ldots, D_{2,30}, D_{2,31}\}$; and the rest can be deduced by analogy, for example, the $32^{th}$ row of the register 311 may be $\{D_{31,0}, D_{31,1}, D_{31,2}, \ldots, D_{31,30}, D_{31,31}\}$. In addition, the X-decoder 312 may generate each of horizontal strings PX(0), PX(1), PX(2), … and PX(31) by grouping the output bits read from a group of horizontal PUF units which are arranged in a horizontal direction, where the horizontal strings $\{PX(nx)|nx=0, 1, 2, \ldots, 31\}=\{D_{nx,0}, D_{nx,1}, D_{nx,2}, \ldots, D_{nx,30}, D_{nx,31}\}$. The Y-decoder 313 may generate each of vertical strings PX(0), PX(1), PX(2), … and PX(31) by grouping the output bits read from a group of vertical PUF units which are arranged in a vertical direction, where the vertical strings $\{PY(ny)|ny=0, 1, 2, \ldots, 31\}=\{D_{0,ny}, D_{1,ny}, D_{2,ny}, \ldots, D_{30,ny}, D_{31,ny}\}$. The Z-decoder 314 may generate each of askew strings PZ(0), PZ(1), PZ(2), … and PZ(31) by grouping the output bits read from a group of askew PUF units which are arranged in an askew direction, where $PZ(0)=\{D_{0,0}, D_{1,1}, D_{2,2}, \ldots, D_{30,30}, D_{31,31}\}$, $PZ(1)=\{D_{0,1}, D_{1,2}, D_{2,3}, \ldots, D_{30,31}, D_{31,0}\}$, and $PZ(2)=\{D_{0,2}, D_{1,3}, D_{2,4}, \ldots, D_{30,0}, D_{31,1}\}$, where the rest can be deduced by analogy, for example, $PZ(30)=\{D_{0,30}, D_{1,31}, D_{2,0}, \ldots, D_{30,28}, D_{31,29}\}$, and $PZ(31)=\{D_{0,31}, D_{1,0}, D_{2,1}, \ldots, D_{30,29}, D_{31,30}\}$. In this embodiment, the BIST circuit 30 may generate at least one health check result according to at least one of the horizontal strings $\{PX(nx)|nx=0, 1, 2, \ldots, 31\}$, at least one of the vertical strings $\{PY(ny)|ny=0, 1, 2, \ldots, 31\}$ and/or at least one of the askew strings $\{PZ(nz)|nz=0, 1, 2, \ldots, 31\}$ (e.g., a combination thereof).

In a first portion of the health check, the comparing circuit 350 may utilize an accumulator 351 therein (e.g., a 5-bit accumulator) to calculate a horizontal hamming weight of each of the horizontal strings PX(nx), a vertical hamming weight of each of the vertical strings PY(ny) and an askew hamming weight of each of the askew strings PZ(nz). The comparing circuit 350 may further utilize a comparator 352 therein (e.g., a 5-bit comparator) to determine whether the horizontal hamming weight, the vertical hamming weight and the askew hamming weight meet predetermined criteria (e.g., falling in a predetermined range), in order to generate the results of the first portion of the health check. It should be noted that a hamming weight of a string is the number of non-zero bit (e.g., the logic value "1") within this string, and the number of zero bits and the number of non-zero bits within a group of random bits are expected to be substantially the same. Based on the purpose of expecting a difference between the number of zero bits and the number of non-zero bits extracted from a group of PUF units of the PUF array 301 to be less than a tolerable value, detailed implementation of the predetermined criteria for determining whether the PUF array 301 passes the first portion of the health check may vary according to the requirement of the manufacturer, and is not limited to any specific rule of the above description. For example, a certain group of PUF units (e.g., any or each of the horizontal strings PX(nx), the vertical strings PY(ny) and the askew strings PZ(nz) mentioned above) may be determined to pass the health check when a hamming weight (e.g., any or each of the horizontal hamming weight, the vertical hamming weight and the askew hamming weight mentioned above) of this group of PUF units is equal to an ideal value (e.g., a 32-bit string have a hamming weight equal to 16). In another example, a certain group of PUF units (e.g., any or each of the horizontal strings PX(nx), the vertical strings PY(ny) and the askew strings PZ(nz) mentioned above) may be determined to pass the health check when an error of a hamming weight (e.g., any or each of the horizontal hamming weight, the vertical hamming weight and the askew hamming weight mentioned above) of this group of PUF units relative to the ideal value falls in a tolerable range such as ±4% (e.g., a 32-bit string have a hamming weight falling in a range from 14 to 18). It should be noted that the predetermined criteria (e.g., the tolerable range) may be determined by calculation based on a statistics distribution model, and may be modified according to requirements (e.g., allowable randomness) in practice.

In a second portion of the health check, a horizontal hamming distance between the horizontal strings PX(m1) and PX(m2), a vertical hamming distance between a vertical strings PY(m1) and PY(m2), and an askew hamming distance between the askew strings PZ(m1) and PZ(m2) may be calculated with the aid of the comparing circuit 330, in order to generate the results of the second portion of the health check according to the horizontal hamming distance, the vertical hamming distance and/or the askew hamming distance (e.g., a combination thereof), where m1 and m2 are two difference values within a range from 0 to 31. In addition, it is preferable to select two groups of PUF units which are physically adjacent to each other for performing the above calculation (e.g., m2=m1+1), but the present invention is not limited thereto. In some embodiments, m2=m1+n, where n may be any suitable integer.

For example, the X-decoder 312 and the MUX 320 may output the horizontal string PX(1) to the register 360 (e.g., a 32-bit register) first, and then outputs the horizontal string PX(2) to the comparing circuit 330. The comparing circuit 330 may compare the horizontal string PX(1) with the horizontal string PX(2) bit by bit, and may calculate a horizontal hamming distance (e.g. by a counter) between the horizontal strings PX(1) and PX(2) according to the comparing result of the horizontal string PX(1) and the horizontal string PX(2). The rest can be deduced by analogy, for example, a horizontal hamming distance between the horizontal strings PX(3) and PX(4), a horizontal hamming distance between the horizontal strings PX(5) and PX(6), . . . and a horizontal hamming distance between the horizontal strings PX(30) and PX(31) may be calculated, i.e., m1=0, 2, 4, . . . and 30, but the present invention is not limited thereto. Similarly, the Y-decoder 313 and the MUX 320 may output the vertical string PY(1) to the register 360 (e.g., a 32-bit register) first, and then outputs the vertical string PY(2) to the comparing circuit 330. The comparing circuit 330 may compare the vertical string PY(1) with the vertical string PY(2) bit by bit, and may calculate a vertical hamming distance (e.g. by the counter) between the vertical strings PY(1) and PY(2) according to the comparing result of the vertical string PY(1) and the vertical string PY(2). The rest can be deduced by analogy, for example, a vertical hamming distance between the vertical strings PY(3) and PY(4), a vertical hamming distance between the vertical strings PY(5) and PY(6), . . . and a vertical hamming distance between the vertical strings PY(30) and PY(31) may be calculated, i.e., m1=0, 2, 4, . . . and 30, but the present invention is not limited thereto. Similarly, the Z-decoder 314 and the MUX 320 may output the askew string PZ(1) to the register 360 (e.g., a 32-bit register) first, and then outputs the askew string PZ(2) to the comparing circuit 330. The comparing circuit 330 may compare the askew string PZ(1) with the askew string PZ(2) bit by bit, and may calculate an askew hamming distance (e.g. by the counter) between the askew strings PZ(1) and PZ(2) according to the comparing result of the askew string PZ(1) and the askew string PZ(2). The rest can be deduced by analogy, for example, an askew hamming distance between the askew strings PZ(3) and PZ(4), an askew hamming distance between the askew strings PZ(5) and PZ(6), . . . and an askew hamming distance between the askew strings PZ(30) and PZ(31) may be calculated, i.e., m1=0, 2, 4, . . . and 30 and m2=1, 3, 5, . . . , 31, but the present invention is not limited thereto. In some embodiment, m1=0, 1, 2, . . . and 30 and m2=1, 2, 3, . . . and 31. In some embodiment, m1=0, 4, 8, 12, . . . , and 28 and m2=1, 5, 9, . . . and 29. These alternative designs should belong to the scope of the present invention.

It should be noted that any two strings extracted from a group of random bits are expected to be as much different from each other as possible, and a hamming distance between the two strings is expected to be greater than a predetermined value. Based on this, detailed implementation of the predetermined criteria for determining whether the PUF array 301 passes the second portion of the health check may vary according to the requirement of the manufacturer, and is not limited to any specific rule of the above description. In addition, after the controller 30C receives the results of the first portion of the health check and the second portion of the health check, the controller 30C may summarize these results to determine whether the PUF array 301 pass the health check. For example, the controller 30C can determine that the PUF array 301 pass the health check only when both of the first portion and the second portion of the health check meet the predetermined criteria, but the present invention is not limited thereto.

Briefly summarized, the embodiments of the present invention provide a BIST circuit and a BIST method, which can ensure the authenticity, the reliability and the randomness with the aid of proposed parity check, margin check and health check. The aforementioned parity check, margin check and health check can be performed respectively or in combination. In addition, as related testing circuit is built-in in conjunction with the PUF device, external measuring equipment is not required, and testing time costs and labor costs can be greatly reduced. In addition, the embodiment of the present invention will not greatly increase additional hardware. Thus, the present invention can improve the efficiency of checking the PUF quality without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A built-in self-test (BIST) circuit for Physical Unclonable Function (PUF) quality check, comprising:
   a PUF array, comprising a plurality of PUF units, wherein each of the PUF units comprises a first cell and a second cell, and the first cell and the second cell are connected to a same bit line;
   a readout circuit, coupled to the PUF array, configured to output an output string comprising a plurality of output bits read from the first cells of selected PUF units, and a parity string comprising a plurality of parity bits read from the second cells of the selected PUF units, wherein the readout circuit comprises:
       a sense amplifier, configured to output the output bit according to a readout voltage read from the first cell of each of the selected PUF units, wherein when the readout voltage is less than a reference voltage, the output bit has a first logic value, and when the readout voltage is greater than the reference voltage, the output bit has a second logic value;

wherein the readout circuit outputs an ON-margin string from the selected PUF units by setting the reference voltage to an ON-margin level, and outputs an OFF-margin string from the selected PUF units by setting the reference voltage to an OFF-margin level; and the first comparing circuit checks whether the ON-margin string is identical to the OFF-margin string, in order to generate a margin check result wherein the ON-margin level is greater than the OFF-margin level; and a first comparing circuit, coupled to the readout circuit, configured to generate a parity check result according to a hamming distance between the output string and the parity string.

2. The BIST circuit of claim 1, wherein for each PUF unit of the selected PUF units, the first comparing circuit checks whether the output bit and the parity bit of the each PUF unit of the selected PUF units have opposite logic values.

3. The BIST circuit of claim 1, further comprising:
a controller, coupled to the first comparing circuit, configured to determine whether the parity check result meets predetermined criteria.

4. The BIST circuit of claim 1, wherein a sense voltage is applied to the first cell when the readout circuit reads the readout voltage from the first cell; the readout circuit outputs an ON-margin string from the selected PUF units by setting the sense voltage to an ON-margin level, and outputs an OFF-margin string from the selected PUF units by setting the sense voltage to an OFF-margin level; and the first comparing circuit checks whether the ON-margin string is identical to the OFF-margin string, in order to generate a margin check result; wherein the ON-margin level is less than the OFF-margin level.

5. The BIST circuit of claim 1, further comprising:
a horizontal decoder, coupled to the PUF array, configured to generate a first horizontal string by grouping output bits read from a first group of horizontal PUF units which are arranged in a horizontal direction;
a vertical decoder, coupled to the PUF array, configured to generate a first vertical string by grouping output bits read from a first group of vertical PUF units which are arranged in a vertical direction; and
an askew decoder, coupled to the PUF array, configured to generate a first askew string by grouping output bits read from a first group of askew PUF units which are arranged in an askew direction;
wherein a health check result is generated according to the first horizontal string, the first vertical string, the first askew string, or a combination thereof.

6. The BIST circuit of claim 5, further comprising:
a second comparing circuit, configured to receive one or more of the first horizontal string, the first vertical string and the first askew string and calculate one or more of a horizontal hamming weight of the first horizontal string, a vertical hamming weight of the first vertical string and an askew hamming weight of the first askew string, and determine whether the one or more of the horizontal hamming weight, the vertical hamming weight and the askew hamming weight meet predetermined criteria, in order to generate the health check result.

7. The BIST circuit of claim 5, wherein the horizontal decoder further generates a second horizontal string by grouping output bits read from a second group of horizontal PUF units which are arranged in the horizontal direction; the vertical decoder further generates a second vertical string by grouping output bits read from a second group of vertical PUF units which are arranged in the vertical direction; the askew decoder further generates a second askew string by grouping output bits read from a second group of askew PUF units which are arranged in the askew direction; a horizontal hamming distance between the first horizontal string and the second horizontal string is calculated with aid of the first comparing circuit, a vertical hamming distance between the first vertical string and the second vertical string is calculated with aid of the first comparing circuit, and an askew hamming distance between the first askew string and the second askew string is calculated with aid of the first comparing circuit, in order to generate the health check result according to the horizontal hamming distance, the vertical hamming distance, the askew hamming distance, or a combination thereof.

8. The BIST circuit of claim 7, wherein the first group of horizontal PUF units are physically adjacent to the second group of horizontal PUF units, the first group of vertical PUF units are physically adjacent to the second group of vertical PUF units, and the first group of askew PUF units are physically adjacent to the second group of askew PUF units.

9. A built-in self-test (BIST) method for Physical Unclonable Function (PUF) quality check, comprising:
utilizing a PUF array to provide PUF values, wherein the PUF array comprises a plurality of PUF units, each of the PUF units comprises a first cell and a second cell, and the first cell and the second cell are connected to a same bit line;
utilizing a readout circuit to output an output string comprising a plurality of output bits read from the first cells of selected PUF units, and a parity string comprising a plurality of parity bits read from the second cells of the selected PUF units, wherein utilizing the readout circuit to output the output bit from the first cell comprise:
utilizing a sense amplifier of the readout circuit to output the output bit according to a readout voltage read from the first cell of each of the selected PUF units;
wherein when the readout voltage is less than a reference voltage, the output bit has a first logic value, and when the readout voltage is greater than the reference voltage, the output bit has a second logic value; and
utilizing a first comparing circuit to generate a parity check result according to a hamming distance between the output string and the parity string;
wherein a sense voltage is applied to the first cell when the readout circuit reads the readout voltage from the first cell, and the BIST method further comprises:
utilizing the readout circuit to output an ON-margin string from the selected PUF units by setting the sense voltage to an ON-margin level, and utilizing the readout circuit to output an OFF-margin string from the selected PUF units by setting the sense voltage to an OFF-margin level; and
utilizing the first comparing circuit to check whether the ON-margin string is identical to the OFF-margin string, in order to generate a margin check result;

wherein the ON-margin level is less than the OFF-margin level.

10. The BIST method of claim 9, wherein utilizing the first comparing circuit to compare the output string with the parity string to generate the parity check result comprises:
for each PUF unit of the selected PUF units, checking whether the output bit and the parity bit of the each PUF unit of the selected PUF units have opposite logic values.

11. The BIST method of claim 9, further comprising:
determining whether the parity check result meets predetermined criteria.

12. The BIST method of claim 9, further comprising:
utilizing the readout circuit to output an ON-margin string from the selected PUF units by setting the reference voltage to an ON-margin level, and utilizing the readout circuit to output an OFF-margin string from the selected PUF units by setting the reference voltage to an OFF-margin level; and
utilizing the first comparing circuit to check whether the ON-margin string is identical to the OFF-margin string, in order to generate a margin check result;
wherein the ON-margin level is greater than the OFF-margin level.

13. The BIST method of claim 9, further comprising:
utilizing a horizontal decoder to generate a first horizontal string by grouping output bits read from a first group of horizontal PUF units which are arranged in a horizontal direction;
utilizing a vertical decoder to generate a first vertical string by grouping output bits read from a first group of vertical PUF units which are arranged in a vertical direction;
utilizing an askew decoder to generate a first askew string by grouping output bits read from a first group of askew PUF units which are arranged in an askew direction; and
generating a health check result according to the first horizontal string, the first vertical string, the first askew string, or a combination thereof.

14. The BIST method of claim 13, further comprising:
utilizing a second comparing circuit to receive one or more of the first horizontal string, the first vertical string and the first askew string and calculate one or more of a horizontal hamming weight of the first horizontal string, a vertical hamming weight of the first vertical string and an askew hamming weight of the first askew string; and
determining whether the one or more of the horizontal hamming weight, the vertical hamming weight and the askew hamming weight meet predetermined criteria, in order to generate the health check result.

15. The BIST method of claim 13, further comprising:
utilizing the horizontal decoder to further generate a second horizontal string by grouping output bits read from a second group of horizontal PUF units which are arranged in the horizontal direction;
utilizing the vertical decoder to further generate a second vertical string by grouping output bits read from a second group of vertical PUF units which are arranged in the vertical direction;
utilizing the askew decoder to further generate a second askew string by grouping output bits read from a second group of askew PUF units which are arranged in the askew direction;
calculating a horizontal hamming distance between the first horizontal string and the second horizontal string with aid of the first comparing circuit;
calculating a vertical hamming distance between the first vertical string and the second vertical string with aid of the first comparing circuit; and
calculating an askew hamming distance between the first askew string and the second askew string with aid of the first comparing circuit, in order to generate the health check result according to the horizontal hamming distance, the vertical hamming distance, the askew hamming distance, or a combination thereof.

16. The BIST method of claim 15, wherein the first group of horizontal PUF units are physically adjacent to the second group of horizontal PUF units, the first group of vertical PUF units are physically adjacent to the second group of vertical PUF units, and the first group of askew PUF units are physically adjacent to the second group of askew PUF units.

17. A built-in self-test (BIST) circuit for Physical Unclonable Function (PUF) quality check, comprising:
a PUF array, comprising a plurality of PUF units;
a comparing circuit, configured to receive a first horizontal string, a first vertical string and a first askew string from the PUF array and calculate a horizontal hamming weight of the first horizontal string, a vertical hamming weight of the first vertical string and an askew hamming weight of the first askew string, and determine whether the horizontal hamming weight, the vertical hamming weight and the askew hamming weight meet predetermined criteria, in order to generate a health check result;
a horizontal decoder, coupled to the PUF array, configured to generate the first horizontal string by grouping output bits read from a first group of horizontal PUF units which are arranged in a horizontal direction;
a vertical decoder, coupled to the PUF array, configured to generate the first vertical string by grouping output bits read from a first group of vertical PUF units which are arranged in a vertical direction; and
an askew decoder, coupled to the PUF array, configured to generate the first askew string by grouping output bits read from a first group of askew PUF units which are arranged in an askew direction;
wherein the health check result is generated according to the first horizontal string, the first vertical string, the first askew string.

* * * * *